United States Patent
Ivers

(10) Patent No.: US 8,054,331 B2
(45) Date of Patent: Nov. 8, 2011

(54) SYSTEMS AND METHODS FOR GENERATING VIDEO TEST SEQUENCES BASED UPON CAPTURED VIDEO DATA

(75) Inventor: Kevin T. Ivers, Woodland, WA (US)

(73) Assignee: Tektronix, Inc., Beaverton, OR (US)

( * ) Notice: Subject to any disclaimer, the term of this patent is extended or adjusted under 35 U.S.C. 154(b) by 1400 days.

(21) Appl. No.: 11/510,080

(22) Filed: Aug. 25, 2006

(65) Prior Publication Data
US 2008/0062265 A1 Mar. 13, 2008

(51) Int. Cl.
*H04N 17/02* (2006.01)
(52) U.S. Cl. .......................... 348/184; 348/181
(58) Field of Classification Search ................. 348/180, 348/181, 184, 187, 188, 189, 191, 192; 702/57, 702/66, 67, 69, 79, 81, 122, 124; 345/440.1
See application file for complete search history.

(56) References Cited

U.S. PATENT DOCUMENTS

| | | | | |
|---|---|---|---|---|
| 4,631,676 A * | 12/1986 | Pugh | ............................. | 600/595 |
| 5,734,422 A | 3/1998 | Maurer et al. | | |
| 5,818,520 A * | 10/1998 | Janko et al. | ................... | 348/192 |
| 5,966,427 A * | 10/1999 | Shaffer et al. | ............... | 379/15.05 |
| 6,424,370 B1 * | 7/2002 | Courtney | ....................... | 348/143 |
| 6,489,969 B1 * | 12/2002 | Garmon et al. | ............... | 715/723 |
| 7,548,253 B2 * | 6/2009 | Kang | ............................. | 348/187 |
| 2004/0012675 A1 * | 1/2004 | Caviedes | ....................... | 348/180 |
| 2004/0036773 A1 * | 2/2004 | Whitling et al. | ........... | 348/207.1 |
| 2004/0042103 A1 * | 3/2004 | Mayer | .............................. | 360/7 |
| 2006/0177119 A1 * | 8/2006 | McPheely et al. | ............. | 382/141 |
| 2006/0238444 A1 * | 10/2006 | Wang et al. | ..................... | 345/55 |
| 2009/0312956 A1 * | 12/2009 | Zombo et al. | .................. | 702/34 |

FOREIGN PATENT DOCUMENTS
EP 0896483 A2 2/1999
* cited by examiner

*Primary Examiner* — Victor Kostak
(74) *Attorney, Agent, or Firm* — Francis I. Gray; Michael A. Nelson

(57) ABSTRACT

A video test system is provided with a circular buffer to capture a video input sequence in response to a trigger, and a test generator output to generate a video test sequence based upon the captured video test sequence. The system may be implemented using a single instrument, or a combination of instruments, such as video waveform monitors and video signal generators. A method is also provided for generating video test sequences based upon captured video sequences.

10 Claims, 3 Drawing Sheets

SYSTEMS AND METHODS FOR GENERATING VIDEO TEST SEQUENCES BASED UPON CAPTURED VIDEO DATA

BACKGROUND

The present invention relates to systems and instruments for monitoring and analyzing video sources.

Video test instruments and systems are able to monitor and analyze video sources in an ever increasing variety of both analog and digital formats. Examples of analog formats include NTSC, PAL, and SECAM. Digital formats include both standard definition (SD) and high definition formats (HD). Examples of digital formats include CCIR601, and various MPEG formats, including H.264. Digital video may be transmitted for example using a serial digital interface (SDI).

In addition to monitoring video sources and analyzing them to provide a variety of measurements, some video test instruments and systems provide the ability to capture portions of a video source signal based upon a trigger. The trigger may be based upon an external event such as a user's input, or a signal from a separate test instrument. Alternatively, some systems provide for triggering based upon internally generated triggers. These internally generated triggers can be based upon a video source meeting certain desirable, or generally undesirable, characteristics, or other information included with the video source signal. For example, a trigger may be produced based upon a cyclical redundancy check (CRC) error, a gamut error, or ancillary data identification (ANC DID).

In some implementations, the raw video data is written into a circular buffer as it is received. In response to a trigger, the video data in the circular buffer is held to effectively capture the signal. The captured video data could consist of parts of a frame, a frame, a sequence of consecutive frames, a sequence of non-consecutive frames, or a combination thereof. The captured raw data is then available for additional analysis within the video test equipment. The captured raw data is not provided in a format that is readily used by other systems or applications.

Video test systems often use a video test generator to provide test patterns, including standard test patterns such as color bars. These test patterns are defined by a code format that can be used to generate a video frame for use in testing. The number and variety of test patterns from a video test generator may be numerous and yet still be limited to specific patterns based upon the nature of the test being conducted. These test patterns have not enabled problematic video sequences to be reproduced to allow for further testing of a video environment, such as a video production system.

SUMMARY

Accordingly, a video test system for a generating video test sequence based upon a captured video sequence is provided. Embodiments of the video test system comprise a circular buffer with a video input and a video output, wherein the video input provides video sequence data to the circular buffer; a trigger system connected to the circular buffer provides a trigger signal to cause the circular buffer to capture a portion of the video sequence data; and a test generator output connected to the video output of the circular buffer produces a video test sequence based upon the captured video sequence data.

In some embodiments the trigger system produces a trigger signal based upon a manual trigger or an external trigger. In other embodiments the trigger system provides a trigger signal internally based upon a cyclical redundancy check (CRC) error, a gamut error, or ancillary data identification.

Embodiments of the video test system include a format converter connected between the video output of the circular buffer and the test generator output to convert the captured video sequence data into a serial transmission format. The captured video sequence data is stored in the circular buffer as raw video data. Raw video data refers to digital video data in parallel format. As used herein, the term format refers to the data format, sometimes referred to as the transport, rather than a video format, such as 1080i59.94. The raw video data is typically unaltered, as it does not include additional header or format data. For example, raw video data includes 10 bit Y, Cb, Cr data. Alternatively, raw video data may be in an RGB format, such as dual link 10 bit 4:4:4 RGB. Dual link HD standards send data on two serial links. In a dual link implementation two circular buffers are used, one for each link. Each link, when converted to parallel format generates 20 bits. The combined 40 bits represent data in the following dual link data formats:

TABLE 1

Dual Link 12-bit 4:2:2 (YCbCr)
Dual Link 10-bit 4:4:4 (YCbCr)
Dual Link 10-bit 4:4:4:4 (YCbCr + A)
Dual Link 12-bit 4:4:4 (YCbCr)
Dual Link 10-bit 4:4:4 (RGB)
Dual Link 10-bit 4:4:4:4 (RGB + A)
Dual Link 12-bit 4:4:4 (RGB)
Dual Link 10-bit 4:4:4 (XYZ)
Dual Link 10-bit 4:4:4:4 (XYZ + A)
Dual Link 12-bit 4:4:4 (XYZ)

where A corresponds to the Alpha channel (chroma keying data), XYZ refers to user-defined chormaticity values (possibly different from typical chromaticity values used in YCbCr)), 4:2:2 refers to 2 samples of Y and one sample each of Cb and Cr, such that the chroma components are sampled at half the rate of the luma component, and 4:4:4 refers to luma and chroma sampled at the same rate.

The video test system may include a capture memory in communication with the circular buffer to provide longer term storage of the captured video sequence data. The capture memory may communicate through a read/write interface to transfer the captured video sequence data back to the circular buffer. Alternatively, a captured video sequence provided from another source may be transferred to the circular buffer.

In some embodiments, the video test system may be formed using multiple instruments. For example, a video waveform monitor to capture a video sequence; and a video signal generator in communication with the video waveform monitor to receive the video sequence and produce a test video sequence based upon the video sequence are combined to form the video test system.

Embodiments of the video test system are formed by providing communication through a network interface. Alternatively, computer readable media is used to allow one instrument to communicate with a second instrument by loading video data obtained from the first instrument into the second instrument.

The video test system may need to convert data from one format to another. This conversion capability may be provided in the video waveform monitor. Alternatively, the conversion may be provided in the video signal generator. In some embodiments, conversion may be provided by converting data to an intermediate format. Also a general purpose computer may be used to provide the data format conversion.

A method of generating a video test sequence is also provided. The method may be performed by capturing a video sequence in a video test instrument; and generating the video test sequence based upon the captured video sequence. In some embodiments the video test sequence is converted from a raw video format into an analog video format or a serial digital video format suitable for further transmission. Alternatively, the video test sequence is converted from a raw video format into a format suitable for network transmission or storage on computer-readable media.

In some embodiments, the video test sequence received from a network transmission or computer-readable media is converted back into the raw video format. In other embodiments, video data from the network transmission or storage on computer-readable media is converted into a format suitable for generating a test video sequence, such as the PIC format used by Tektronix, Inc., using a video signal generator, wherein generating the video test sequence based upon the video sequence is accomplished using a separate video test instrument, such as a video signal generator. The term video signal generator as used herein refers to instruments commonly referred to as video signal generators, and to any other instrument or circuit capable of providing a video output signal based on digital video data.

A method is also provided to capture a video sequence in a circular buffer; and convert the video sequence into a standard format suitable for transmission over a computer network, or storage on computer-readable media, and use on a general purpose computer. The computer-readable media may be a hard drive, a USB drive, a floppy or an optical disk, for example. In some embodiments, the standard format is a binary file with a file header, a comma separated values (CSV) file, a spreadsheet-readable format or a bit-map format.

DETAILED DESCRIPTION

Figure 1:
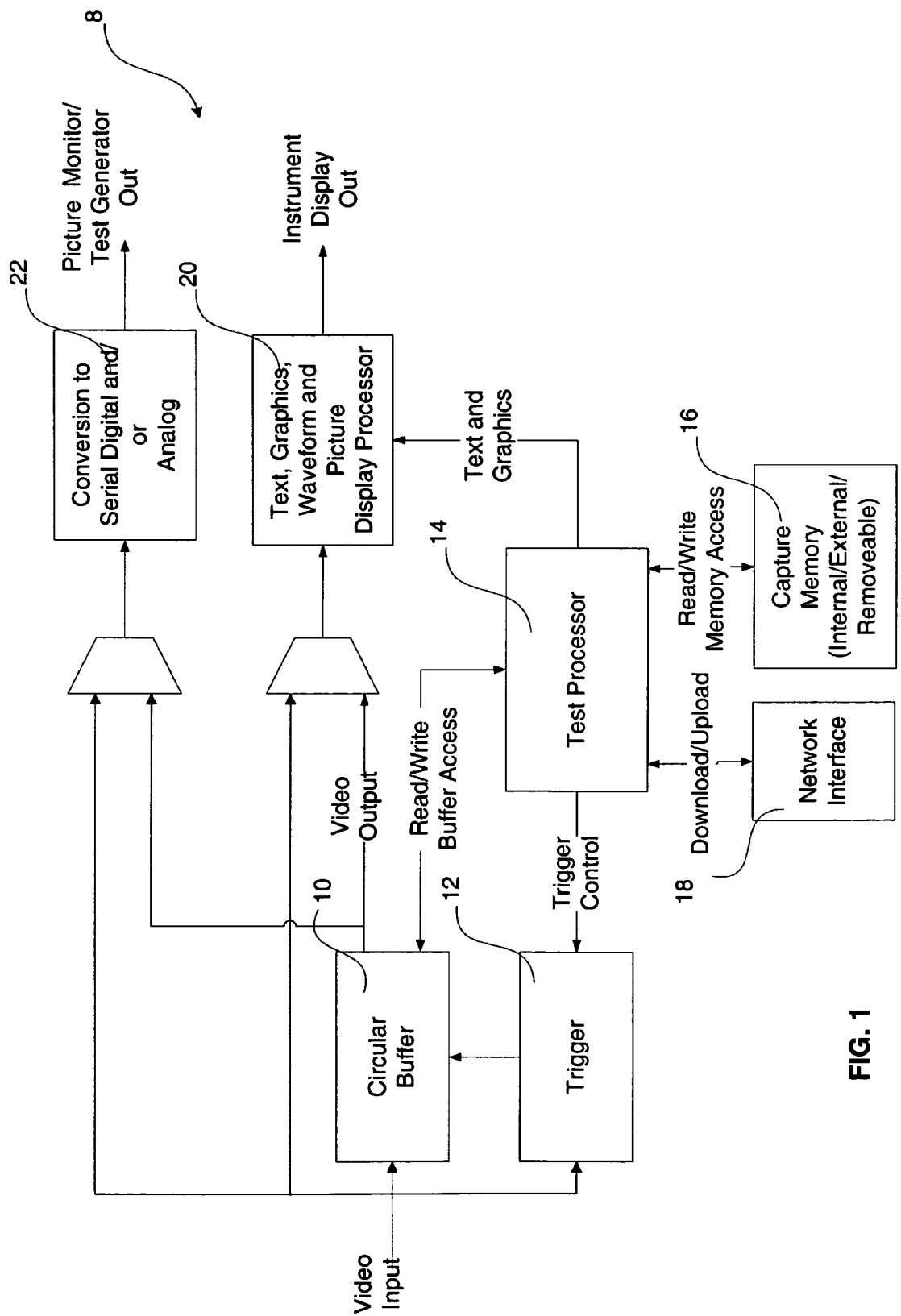
FIG. 1 is a block diagram of a video test system.

A first embodiment of the present system 8 is shown in FIG. 1. A video input is provided to a circular buffer 10 and a trigger circuit 12, which is controlled by a test processor 14. A more detailed description of a digital video error analyzer including a trigger system can be found in U.S. Pat. No. 5,734,422, which is hereby incorporated herein by reference. In one embodiment, the video input may have previously been converted from a format suitable for transmission to a format suitable for storage and processing. For example, digital video may be input to the instrument in a serial NRZ format, which is used for coax distribution, and converted to a parallel format and provided as the video input. The video input data provided to the circular buffer is raw video data, for example 10 bit parallel data. The video input is converted from a serial digital or an analog format prior to introduction to the circular buffer or trigger. In one embodiment, the trigger circuit 12 signals the circular buffer 10 to hold the data currently in the circular buffer 10, such that the circular buffer 10 acts as temporary storage for the latest captured data. The data held in the circular buffer 10 is then available for the processor 14 to provide analysis of the video data that has been captured in the circular buffer 10. In alternative embodiments, the trigger may cause the circular buffer to be written to a separate storage. As shown in FIG. 1, the test processor 14 has read/write access to a capture memory 16. The capture memory 16 may be an internal memory, an external memory or a removable memory. The capture memory 16 may be implemented using one or more hard drives, static RAM, such a flash memory, optical storage, such as CD-R or recordable DVDs, or any other medium for storing digital data. In one embodiment, the capture memory is for example a USB memory stick. In which case, the test processor 14 converts the raw format video data from the circular buffer into a USB format. In alternative embodiments, the test processor 14 converts the raw format video data from the circular buffer into other formats usable by other instruments, such as video test signal generators, or general purpose computers. In some embodiments, the test processor 14 is connected to a network interface 18 to enable data from circular buffer to be converted and sent over a network, such as a local area network (LAN), a wide area network (WAN), or a global network. The network interface 18 may be implemented as an Ethernet connection, for example.

The test processor 14 is connected to a display processor 20 that provides an instrument display output. The display processor 20 provides the instrument display output with the results of the test processor analysis, including measurement results. These results may be provided simultaneously with a video output from the circular buffer 10, either within a common display window, or in separate display windows within a windowed display environment. The video output from the circular buffer 10 may be a looped-sequence video output. In another embodiment, the display processor 20 displays the video input directly, for example in combination with text, graphics, waveforms or other data from the test processor 14.

In one embodiment, the video in is provided to a monitor, such as a picture monitor. A video format converter 22 is provided to convert a raw video format, such as 10 bit parallel raw video data, into serial digital, or analog suitable for input to the picture monitor. In an alternative embodiment, the circular buffer provides its video output to the video format converter 22, so that the converted video is provided as a test generator output.

In an embodiment of the system 8, as shown in FIG. 1, the test processor 14 is able to write to the circular buffer 10. In one embodiment, the test processor 14 provides video data from the capture memory, or the network interface. The video data may be data previously transferred from the circular buffer 10, for example based on a trigger. Alternatively, the test processor 14 provides video data that was obtained from a separate test instrument. Further, the test processor 14 may modify the video data prior to providing it to the circular buffer. The test processor either provides raw video data obtained from the network interface, or the capture memory, or converts video data stored in other formats back to a raw data format suitable for writing to the circular buffer 10.

In some embodiments, the circular buffer 10 is a multi-banked circular buffer. A multi-banked circular buffer enables multiple sets of video data to be stored simultaneously within the circular buffer. The circular buffer can then store multiple sets of captured video data, or a combination of recently captured video data along with previously captured video data that was provided by the test processor after being read from the capture memory, or from the network interface.

In operation, this feature enables analysis to be preformed in a manner similar, or identical, to that provided during the original acquisition. Furthermore, captured video data from other instruments, including remote instruments can be provided for analysis within the system 8.

Figure 2:
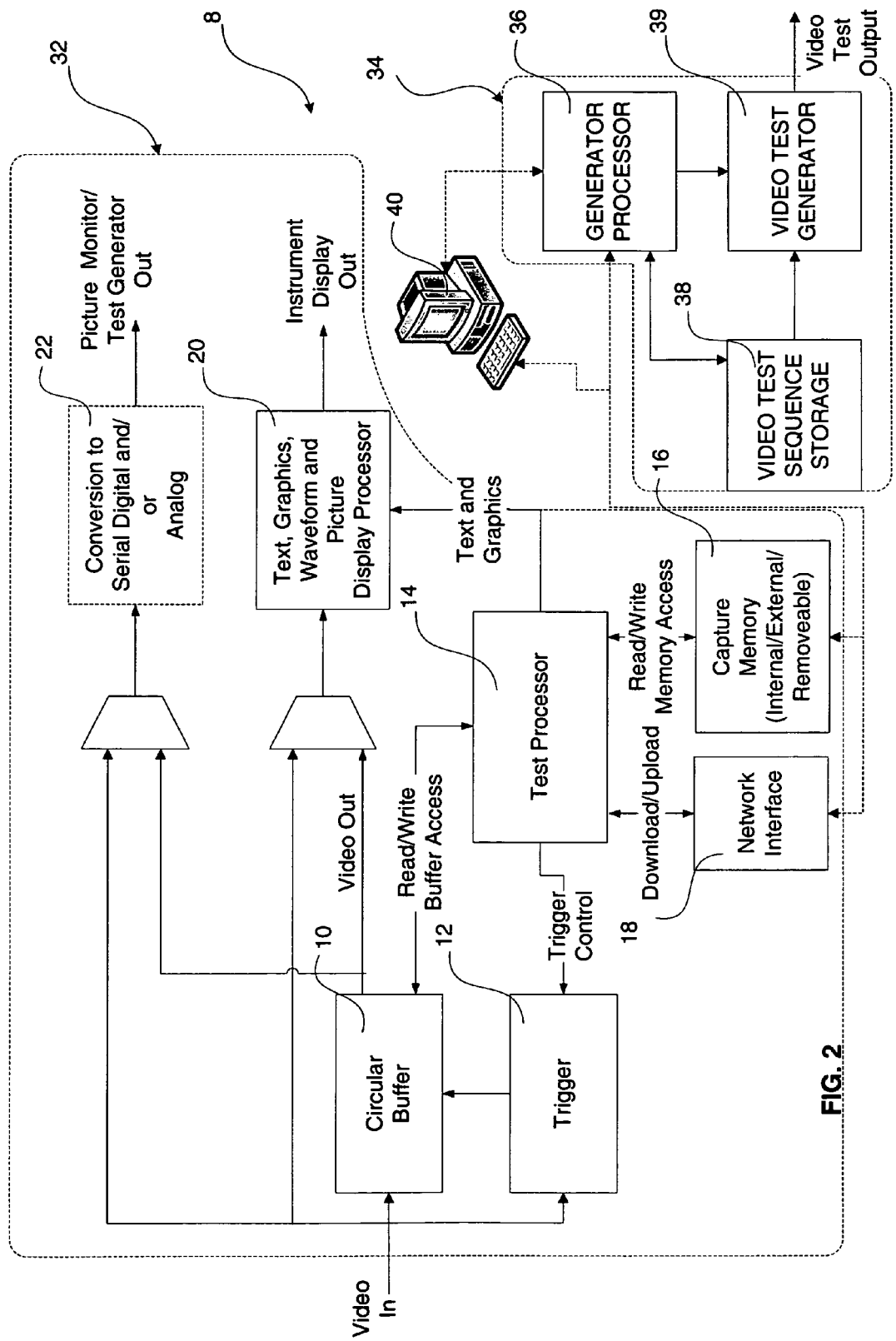
FIG. 2 is a block diagram of a video test system.

Another embodiment of the present system 8 is shown in FIG. 2. In this embodiment, the system comprises a video test system 32 capable of capturing a video sequence, and a video test generator system 34, which is capable of generating a video test sequence, in data communication with the video test system 32. Communication means that the video test system is able to receive data by any suitable method, including by means of a direct connection, such as an internal connection, a network connection, or by having an input for receiving data from media, such as a USB memory device, a floppy, a CD, a removable hard drive, a firewire drive, or other media capable of storing data and being used to transfer data from one device to another. The video test generator system 34 comprises a generator processor 36, a video test sequence storage 38, and a video test generator 39 having a video test output. In an embodiment of this system, the video test generator system 34 receives raw captured data from the video test system 32 and uses the raw data to generate the video test output. In another embodiment, the video test system 32 converts the video data stored in either the circular buffer, or the capture memory into a format that is preferred by the video test generator system 34. Alternatively, the video test system may convert the video data into an intermediate standard format. In which case, the video generator processor 34 receives video data in the intermediate standard format and converts it into a format suitable for the video test generator 39.

In another alternative embodiment, as shown in FIG. 2, a general purpose computer 40, such as a PC or Macintosh based computer, is also provided in data communication with either the video test system 32, the video test generator system 34, or both. The general purpose computer may run any of a variety of operating systems including DOS, Windows, Linux, or OS-X. In an embodiment of the present system, the general purpose computer 40 is used to alter a captured video file received from the video test system 32 prior to providing it to the video test generator system 34. In this way, a custom video test signal is generated from either a standard video test signal that has been captured, or from a non-standard video test signal that has been captured based upon selected criteria.

In operation, using the system shown in FIG. 2, it may be desirable to convert the raw video data into a standard format that is usable by the general purpose computer for further analysis, or as an intermediate format that is convertible to a format compatible with the video test generator system, such as PIC format. The standard/intermediate format conversion, for example, may convert captured video data to a binary file with a header. The header might include information describing the time, and date of capture, the trigger event, or events, that caused the capture of the video data, the video format captured, and the quantity of the video data contained. For serial digital video data, the video data would consist of 10 bit values representing Y, Cb, Cr picture data, and may include ancillary data with EAV/SAV for example.

In another embodiment, the captured video data is converted into a USB format for storage and further processing on the video test system, or on a separate video test system, video test generator system, or general purpose computer.

In other embodiments, the captured video data is converted to an industry standard Comma Separated Values (CSV) file that can then be read by other instruments or general purpose computers to provide further analysis, or test signal generation. In a further embodiment, the captured video data is converted to a standard spreadsheet format.

The system shown in FIG. 2 identifies separate systems and processors. As those skilled in the art understand, modern test systems may be implemented using a general purpose computer system, including a general purpose operating system, as described above. In this case, a common general purpose computer, or processor, is used to implement the functionality of the identified processors based upon appropriate programming. In some embodiments of these systems, all of the components are provided within a single instrument.

Figure 3:
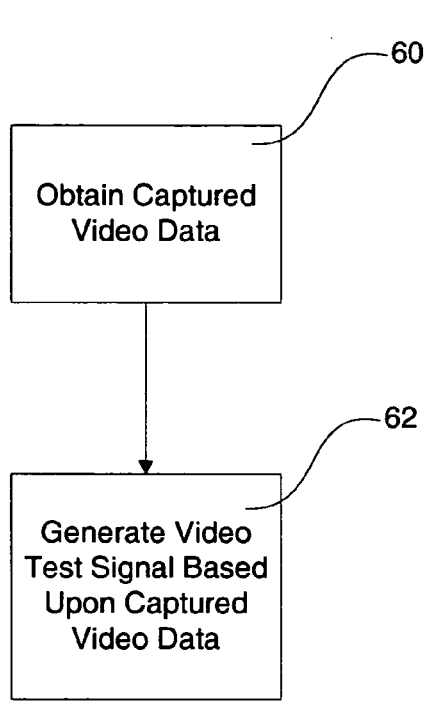
FIG. 3 is a block diagram of a method of generating a video test signal based upon a captured video sequence.

FIG. 3 illustrates an embodiment of a method for regenerating a video test signal based upon a captured video signal. Captured video data is obtained as shown at step 60. The captured video data may be obtained from within the same instrument, or from a separate instrument. It may be obtained through a network connection, or using some form of media as described above. A video test signal is generated based upon the captured video data at step 62.

Figure 4:
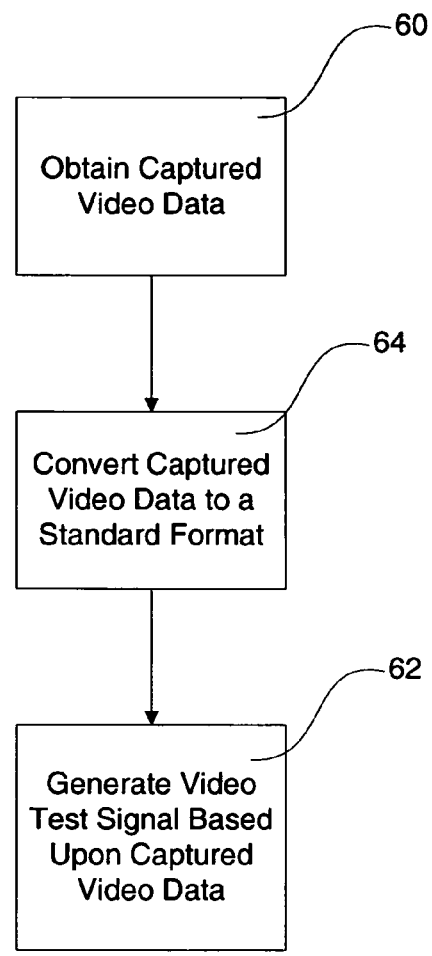
FIG. 4 is a block diagram of a method of generating a video test signal based upon a captured video sequence.

As shown in FIG. 4, an additional step 64 of converting the captured video data into a standard format is provided prior to generating the video test signal. The converting step converts the captured video data directly into a format suitable for generating a video test signal using a video test generator or alternatively may be converted to an intermediate standard format prior to conversion to the format suitable for generating a video test signal.

Figure 5:
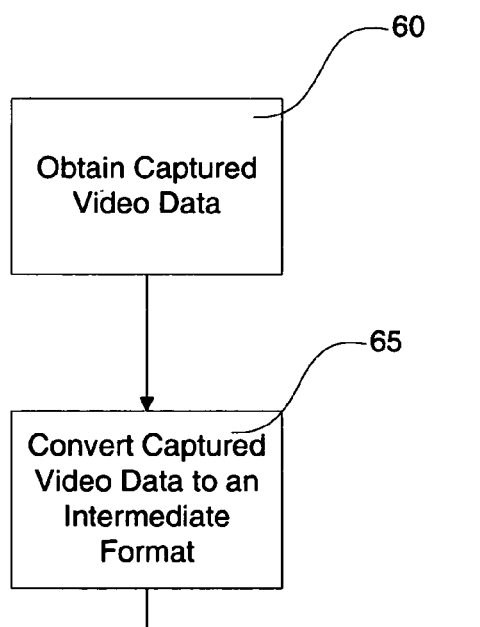
FIG. 5 is a block diagram of a method of generating a video test signal based upon a captured video sequence.
Figure 5:
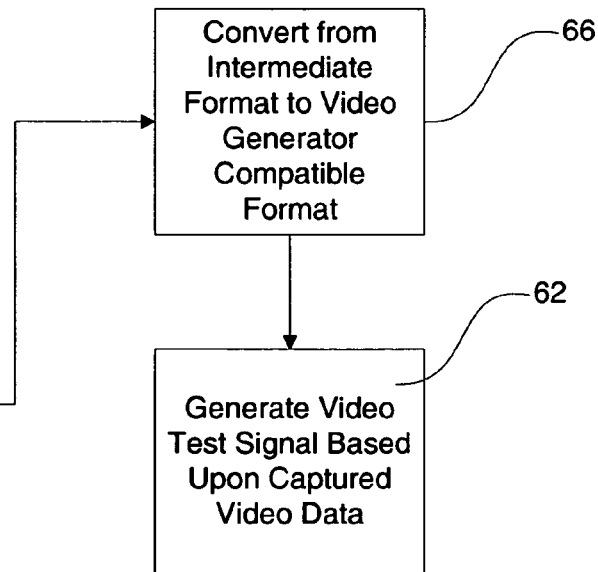

FIG. 5 illustrates an embodiment for generating a video test signal based upon captured video data. The captured video data is converted into an intermediate format as shown in step 65. The intermediate format could be a format suitable for storage on a computer-readable media, network transmission, data analysis, or data manipulation. The captured video data is then converted from the intermediate format into a format suitable for generating a video test signal as provided at step 66. This format could be the raw format used by the original video capture system, or a format suitable for a different video generator instrument. During, or between, the conversion steps 65 and 66, the captured video data may be modified to increase or reduce the likelihood of producing an error or other result in the test system.

It will be obvious to those having skill in the art that many changes may be made to the details of the above-described embodiments of this invention without departing from the underlying principles thereof. The scope of the present invention should, therefore, be determined by the following claims.

What is claimed is:

1. A video test system for generating a video test sequence comprising:
   a circular buffer having a video input, wherein the video input provides video sequence data to the circular buffer;
   a trigger system connected to the circular buffer to provide a trigger signal to cause the circular buffer to capture at least a portion of the video sequence data, wherein the trigger system provides the trigger signal in response to a characteristic of the video sequence data or information included with the video sequence data; and
   a test generator output in communication with the circular buffer to produce a video test sequence based upon the captured video sequence data.

2. The video test system as provided in claim 1, wherein the trigger system provides the trigger signal based upon a manual trigger, or an external trigger.

3. The video test system as provided in claim 1, wherein the trigger system provides the trigger signal based upon a cyclical redundancy check (CRC) error, a gamut error, or ancillary data identification.

4. The video test system as provided in claim 1, further comprising a format converter connected between the circular buffer and the test generator output to convert the captured video sequence data into a serial transmission format.

5. The video test system as provided in claim 1, further comprising a capture memory in communication with the circular buffer to provide storage of the captured video sequence data.

6. The video test system as provided in claim 5, wherein the capture memory communicates through a read/write interface to transfer the captured video sequence data to the circular buffer.

7. The video test system as provided in claim 5, further comprising a test processor connected between the capture memory and the circular buffer to provide format conversion between the captured video sequence provided by the circular buffer and a format suitable for storage on the capture memory, and to provide communication between the capture memory and the circular buffer.

8. A video test system comprising:

a video waveform monitor to capture a video sequence; and a video signal generator in communication with the video waveform monitor to receive the video sequence and produce a test video sequence based upon the video sequence;

wherein communication is provided through a network interface.

9. A video test system comprising:

a video waveform monitor to capture a video sequence; and a video signal generator in communication with the video waveform monitor to receive the video sequence and produce a test video sequence based upon the video sequence;

wherein communication is provided using computer readable media.

10. A video test system comprising:

a video waveform monitor to capture a video sequence; and a video signal generator in communication with the video waveform monitor to receive the video sequence and produce a test video sequence based upon the video sequence;

wherein the video waveform monitor provides conversion of the video sequence into a format suitable for use by the video signal generator.

\* \* \* \* \*